(12) United States Patent
Ryowa et al.

(10) Patent No.: US 7,892,452 B2
(45) Date of Patent: Feb. 22, 2011

(54) NANOCRYSTALLINE PHOSPHOR AND COATED NANOCRYSTALLINE PHOSPHOR AS WELL AS METHOD OF PREPARING COATED NANOCRYSTALLINE PHOSPHOR

(75) Inventors: Tatsuya Ryowa, Nara (JP); Hajime Saito, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 628 days.

(21) Appl. No.: 11/871,333

(22) Filed: Oct. 12, 2007

(65) Prior Publication Data

US 2008/0173845 A1    Jul. 24, 2008

(30) Foreign Application Priority Data

Oct. 12, 2006    (JP) ............................. 2006-278627

(51) Int. Cl.
*C09K 11/08* (2006.01)
*C09K 11/62* (2006.01)

(52) U.S. Cl. ............................. 252/301.4 R; 428/403; 977/816; 977/817; 977/830; 977/834

(58) Field of Classification Search .......... 252/301.4 R; 428/403; 977/816, 817, 830, 834
See application file for complete search history.

(56) References Cited

U.S. PATENT DOCUMENTS

| | | | |
|---|---|---|---|
| 6,576,291 B2 * | 6/2003 | Bawendi et al. ............. | 427/215 |
| 6,815,064 B2 * | 11/2004 | Treadway et al. ........... | 428/403 |
| 2005/0012076 A1 | 1/2005 | Morioka | |
| 2006/0060862 A1 * | 3/2006 | Bawendi et al. ............... | 257/76 |
| 2006/0158089 A1 | 7/2006 | Saito et al. | |
| 2006/0165621 A1 | 7/2006 | Dubertret et al. | |

| | | |
|---|---|---|
| 2008/0173845 A1 | 7/2008 | Ryowa et al. |

FOREIGN PATENT DOCUMENTS

| | | |
|---|---|---|
| EP | 1 798 270 A1 | 6/2007 |
| JP | 11-279550 A | 10/1999 |
| JP | 2000-008035 A | 1/2000 |
| JP | 2000-198978 A | 7/2000 |
| JP | 2002-38145 A | 2/2002 |
| JP | 2004-107572 A | 4/2004 |

(Continued)

OTHER PUBLICATIONS

Full English translation for JP 2004-307679.*

(Continued)

*Primary Examiner*—C. Melissa Koslow
(74) *Attorney, Agent, or Firm*—Birch, Stewart, Kolasch & Birch, LLP (57) ABSTRACT

Provided is a nanocrystalline phosphor having a core/shell structure formed by a core of a group 13 nitride semiconductor and a shell layer, covering the core, including a shell film of a group 13 nitride mixed crystal semiconductor. This nanocrystalline phosphor has high luminous efficiency, and is excellent in reliability. Also provided is a coated nanocrystalline phosphor prepared by bonding modified organic molecules to the nanocrystalline phosphor and/or coating the nanocrystalline phosphor with the modified organic molecules. This coated nanocrystalline phosphor has high dispersibility. Further provided is a method of preparing a coated nanocrystalline phosphor by heating a mixed solution containing a core of a group 13 nitride semiconductor, a nitrogen-containing compound, a group 13 element-containing compound and modified organic molecules.

11 Claims, 3 Drawing Sheets

FOREIGN PATENT DOCUMENTS

| | | | |
|---|---|---|---|
| JP | 2004-307679 | * | 11/2004 |
| JP | 2004-307679 A | | 11/2004 |
| JP | 2005-197317 A | | 7/2005 |
| JP | 2006-83219 A | | 3/2006 |
| JP | 2006-83260 | * | 3/2006 |
| JP | 2006-83260 A | | 3/2006 |
| JP | 2006-328234 A | | 12/2006 |
| JP | 2007-77245 A | | 3/2007 |
| JP | 2007-77246 A | | 3/2007 |
| JP | 2007-238712 A | | 9/2007 |
| JP | 2008-094968 A | | 4/2008 |
| WO | WO-2005/106082 A1 | | 11/2005 |
| WO | WO 2006/027778 | * | 3/2006 |
| WO | WO-2006/033396 A1 | | 3/2006 |
| WO | WO-2006/054952 A1 | | 5/2006 |

OTHER PUBLICATIONS

Full English translation for JP 2006-83260.*
Murray et al., "Synthesis and Characterization of Nearly Monodisperse CdE (E=S, Se, Te) Semiconductor Nanocrystallites," J. Am. Chem. Soc., 1993, vol. 115, pp. 8706-8715.
Eychmuller et al.; "A quantum dot quantum well: CdS/HgS/CdS," Chemical Physics Letters; vol. 208, No. 1, 2; Jun. 4, 1993, pp. 59-62.
Xie et al., "A Benzene-Thermal Synthetic Route to Nanocrystalline GaN", Science, vol. 272, No. 5270, Jun. 28, 1996, pp. 1926-1927.

* cited by examiner

FIG.1

SEVERAL nm

FIG.2

SEVERAL 10 nm

FIG.3

NANOCRYSTALLINE PHOSPHOR AND COATED NANOCRYSTALLINE PHOSPHOR AS WELL AS METHOD OF PREPARING COATED NANOCRYSTALLINE PHOSPHOR

This nonprovisional application is based on Japanese Patent Application No. 2006-278627 filed with the Japan Patent Office on Oct. 12, 2006, the entire contents of which are hereby incorporated by reference.

BACKGROUND OF THE INVENTION

1. Field of the Invention

The present invention relates to a nanocrystalline phosphor and a coated nanocrystalline phosphor as well as a method of preparing a coated nanocrystalline phosphor, and more specifically, it relates to a nanocrystalline phosphor improved in luminous intensity and luminous efficiency, a coated nanocrystalline phosphor prepared by coating a nanocrystalline phosphor with modified organic molecules and a method of preparing a coated nanocrystalline phosphor through a simple synthetic procedure with a high synthesis yield.

2. Description of the Background Art

It is known that semiconductor crystallites (hereinafter referred to as "crystallites") exhibit a quantum size effect when reduced to about the Bohr radius. The quantum size effect is such an effect that electrons confined in a nanometer-sized space remarkably exhibit the property of a wave motion. When a substance is reduced in size, electrons therein cannot freely move and the energy thereof can assume only an unarbitrary specific value in such a state, to result in the quantum size effect. For example, the wavelength of light emitted from crystallites of about the Bohr radius is reduced in proportion to the size (refer to C. B. Murray, D. J. Norris and M. G. Bawendi "Synthesis and Characterization of Nearly Monodisperse CdE (E=S, Se, Te) Semiconductor Nanocrystallites", Journal of the American Chemical Society, 1993, 115, pp. 8706-8715; hereinafter referred to as "Document 1"). However, a phosphor prepared from a group II-VI compound semiconductor described in Document 1 is inferior in reliability and durability, and contains an environmental pollutant such as cadmium or selenium. Therefore, a material substituting for this phosphor has been demanded.

An attempt has been made to synthesize microcrystals of a nitride-based semiconductor as a material substituting for the group II-VI compound semiconductor (refer to Japanese Patent Laying-Open 2000-198978; hereinafter referred to as "Document 2"). According to Document 2, a gallium nitride phosphor is synthesized by preparing gallium oxide from gallium hydroxide and heating this gallium oxide in ammonia. According to Document 2, the heating temperature is about 1000° C., for causing a vapor phase reaction.

Synthesis of GaN crystallites is studied also in a liquid phase reaction (refer to Yi Xie, Yitai Qian, Wenzhong Wang, Shuyuan Zhang and Yuheng Zhang "A Benzene-Thermal Synthetic Route to Nanocrystalline GaN", SCIENCE, June, 1996, Vol. 272, No. 5270, pp. 1926-1927; hereinafter referred to as "Document 3"). According to Document 3, GaN nanocrystallites are synthesized by reacting gallium trichloride and lithium nitride with each other in a benzene solution.

However, GaN crystallites have an emission wavelength mainly in the near ultraviolet region. Further, the GaN crystallites cannot exhibit a quantum size effect. Therefore, deep studies are conducted in order to implement crystallites of group 13 nitride semiconductor having an emission wavelength in the visible region, and a study for controlling the mixed crystal ratio of crystallites in the group 13 nitride semiconductor is conducted as a part thereof.

SUMMARY OF THE INVENTION

In consideration of the aforementioned circumstances, an object of the present invention is to provide a nanocrystalline phosphor including a shell layer of a group 13 nitride mixed crystal semiconductor, having high luminous efficiency and excellent reliability, and allowing control of the mixed crystal ratio in the group 13 nitride mixed crystal semiconductor.

Another object of the present invention is to provide a coated nanocrystalline phosphor improved in dispersibility by modified organic molecules strongly bonded to the surface of a nanocrystalline phosphor and a method of simply and efficiently preparing the coated nanocrystalline phosphor.

The present invention provides a nanocrystalline phosphor having a core/shell structure of a core of a group 13 nitride semiconductor and a shell layer, covering the core, including a shell film of a group 13 nitride mixed crystal semiconductor.

The present invention also provides a coated nanocrystalline phosphor prepared by bonding modified organic molecules to the outer surface of a nanocrystalline phosphor and/or coating the outer surface of the nanocrystalline phosphor with the modified organic molecules.

In the coated nanocrystalline phosphor according to the present invention, nitrogen atoms of the core and group 13 atoms of the shell layer are preferably chemically bonded to each other, and nitrogen atoms of the shell layer and group 13 atoms of the core are preferably chemically bonded to each other.

In the coated nanocrystalline phosphor according to the present invention, the core is preferably made of gallium nitride.

In the coated nanocrystalline phosphor according to the present invention, the group 13 nitride mixed crystal semiconductor preferably contains 5 to 60 mole % of indium atoms.

In the coated nanocrystalline phosphor according to the present invention, the thickness of the shell layer is preferably not more than twice the Bohr radius.

In the coated nanocrystalline phosphor according to the present invention, the shell layer preferably has a multilayer structure formed by a plurality of shell films.

In the coated nanocrystalline phosphor according to the present invention, the shell layer is preferably formed by a first shell film of a group 13 nitride mixed crystal semiconductor having a smaller band gap than the core and covering the core, and a second shell film having a larger band gap than the first shell film and covering the first shell film.

The present invention further provides a method of preparing a coated nanocrystalline phosphor by mixing modified organic molecules into a mixed solution containing a core of a group 13 nitride semiconductor, a nitrogen-containing compound and a group 13 element-containing compound.

In the method of preparing a coated nanocrystalline phosphor according to the present invention, at least either the group 13 element-containing compound or the nitrogen-containing compound is preferably a compound having bonds of indium and/or gallium and nitrogen.

In the method of preparing a coated nanocrystalline phosphor according to the present invention, a solvent for the mixed solution is preferably a hydrocarbon-based solvent.

In the method of preparing a coated nanocrystalline phosphor according to the present invention, the temperature for heating the mixed solution is preferably 180 to 500° C.

In the method of preparing a coated nanocrystalline phosphor according to the present invention, at least two types of modified organic molecules are preferably employed.

The term "core/shell structure" of the nanocrystalline phosphor according to the present invention denotes the inner core/outer shell structure itself which does not necessarily have a mechanism of emission resulting from energy transfer from the shell to the core.

The nanocrystalline phosphor according to the present invention allows control of the mixed crystal ratio in the shell layer of the group 13 nitride mixed crystal semiconductor, has an emission wavelength in the visible region, and exhibits high luminous efficiency and excellent reliability. The coated nanocrystalline phosphor according to the present invention is excellent in dispersibility.

According to the inventive method of preparing a coated nanocrystalline phosphor, a coated nanocrystalline phosphor can be simply and efficiently obtained.

The present invention provides a nanocrystalline phosphor excellent in luminous efficiency and a coated nanocrystalline phosphor excellent in dispersibility and medium affinity as well as a high-yield method of preparing a coated nanocrystalline phosphor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[Structure of Coated Nanocrystalline Phosphor]

Figure 1:
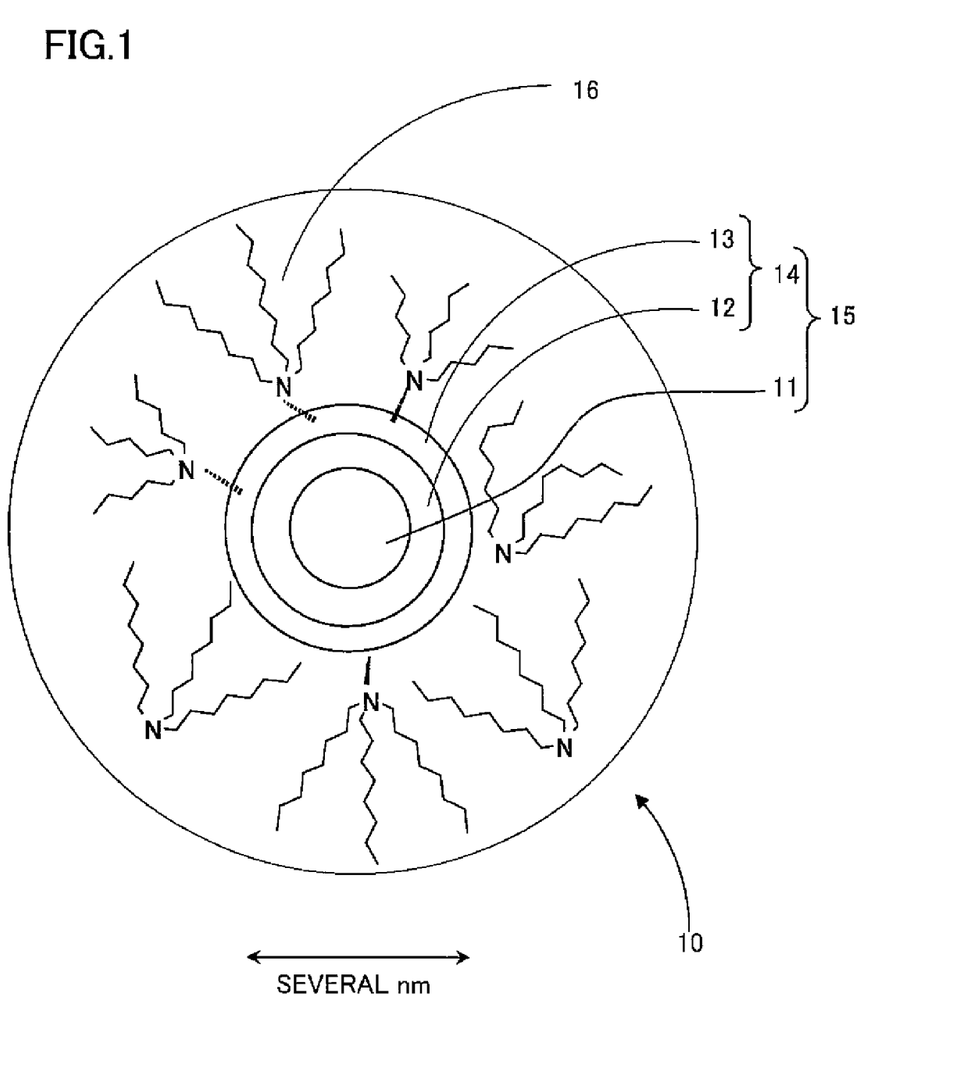
FIG. 1 is a model diagram showing a coated nanocrystalline phosphor according to a preferred embodiment of the present invention.

FIG. 1 is a model diagram showing a coated nanocrystalline phosphor 10 according to a preferred embodiment of the present invention. Coated nanocrystalline phosphor 10 is now described with reference to FIG. 1. Referring to FIG. 1, the dimensional relation between the lengths, the magnitudes, the widths etc. is properly varied in order to clarify and simplify the illustration, and does not correspond to the actual dimensions.

The basic structure of coated nanocrystalline phosphor 10 according to the present invention is obtained by bonding modified organic molecules 16 to the outer surface of a nanocrystalline phosphor 15 formed by a core 11 and a shell layer 14 covering core 11 and/or coating the surface of nanocrystalline phosphor 15 with modified organic molecules 16. According to the present invention, core 11 is made of a group 13 nitride semiconductor, and shell layer 14 includes a shell film of a group 13 nitride mixed crystal semiconductor. Shell layer 14 may have a single-layer structure formed by a single shell film, or a multilayer structure formed by a plurality of shell films. When shell layer 14 is constituted of a plurality of shell films, at least one shell film may simply be made of the group 13 nitride mixed crystal semiconductor. FIG. 1 shows shell layer 14 formed by a first shell film 12 directly covering core 11 and a second shell film 13 covering first shell film 12 for convenience.

Modified organic molecules 16 are bonded to nanocrystalline phosphor 15 by physical bonding force and/or chemical bonding force. Parts of modified organic molecules 16 are not directly bonded to the outer surface of shell layer 14, but present around nanocrystalline phosphor 15. Nanocrystalline phosphor 15 is coated with modified organic molecules 16.

Shell layer 14 may partially or entirely cover core 11, and the thickness of shell layer 14 may be distributional.

[Nanocrystalline Phosphor]

Nanocrystalline phosphor 15 according to the present invention is constituted of core 11 and shell layer 14 covering core 11. Core 11 is made of the group 13 nitride semiconductor, which is a compound having bonds of atoms of an element selected from the group 13 elements and nitrogen atoms. Shell layer 14 includes the shell film of the group 13 nitride mixed crystal semiconductor, which is a compound having bonds of atoms of at least two elements selected from the group 13 elements and nitrogen atoms. Shell layer 14 may include another shell film of a group 13 nitride semiconductor, which is a compound having bonds of atoms of an element selected from the group 13 elements and nitrogen atoms. The mixing ratio of the group 13 element in the compound forming the group 13 nitride mixed crystal semiconductor is hereinafter referred to as the mixed crystal ratio.

In nanocrystalline phosphor 15, nitrogen atoms having dangling bonds and atoms of the group 13 element are arranged on the surface of core 11. The element serving as the raw material for shell layer 14 is bonded to the dangling bonds. At this time, the nitrogen atoms on the surface of core 11 and the atoms of the group 13 element forming shell layer 14 as well as the atoms of the group 13 element forming the surface of core 11 and the nitrogen atoms of shell layer 14 are chemically bonded to each other. The atoms of the element forming shell layer 14 regularly grow due to the presence of core 11, whereby the shell films of the group 13 nitride mixed crystal semiconductor and the group 13 nitride semiconductor forming shell layer 14 have small numbers of crystal defects. When shell layer 14 has a multilayer structure, atoms of the group 13 element and the nitrogen atoms of each shell film can be chemically bonded to the nitrogen atoms and the atoms of the group 13 element of the adjacent shell film.

The chemical bonds may be coordinate bonds, ionic bonds, hydrogen bonds or bonds by van der Waals forces, for example. The chemical bonds can be confirmed by X-ray photoelectron spectroscopy, for example.

The shell film of the group 13 nitride mixed crystal semiconductor serves as an emission layer of nanocrystalline phosphor 15, according to the following principle: The shell film of the group 13 nitride mixed crystal semiconductor absorbs excitation light and emits light. This shell film absorbs and excites the energy of the excitation light. Core 11 according to the present invention can assume only a plurality of discrete energy levels, a single level may also be available. The shell film of the group 13 nitride mixed crystal semiconductor according to the present invention is set to a small thickness for exhibiting a quantum size effect as described later, whereby the light energy absorbed and excited by the shell film makes a transition between ground levels of the conduction band and the valence band, leading to emission of light having a wavelength corresponding to the energy. The band gap can be controlled by controlling the mixed crystal ratio in the shell film, thereby controlling the color of the light emitted from nanocrystalline phosphor 15 as a result.

The shell film of the group 13 nitride mixed crystal semiconductor preferably contains indium atoms and gallium atoms. In this case, nanocrystalline phosphor 15 can absorb excitation light of 400 to 410 nm with high efficiency for emitting red, green or blue light having high luminous efficiency.

When shell layer 14 has a multilayer structure, first shell film 12 directly covering core 11 is preferably made of the group 13 nitride mixed crystal semiconductor. First shell film 12 is adjacent to core 11, whereby the color of the light emitted from nanocrystalline phosphor 15 can be easily controlled by efficiently conducting energy conversion as to the light absorbed by core 11. At this time, first shell film 12 is preferably made of an indium nitride-gallium mixed crystal semiconductor. When first shell film 12 of the group 13 nitride mixed crystal semiconductor is formed around core 11 of the group 13 nitride semiconductor, mixed crystals can be so easily formed that nanocrystalline phosphor 15 having high luminous efficiency and excellent reliability can be obtained. Further, surface defects of core 11 can be capped.

When shell layer 14 has a multilayer structure, further, the band gaps of the respective shell films are preferably increased stepwise as the distances between core 11 and the shell films constituting the multilayer structure are increased. Consequently, energy conversion can be efficiently conducted.

When shell layer 14 has a multilayer structure, the outermost one of the shell films constituting shell layer 14 preferably has a larger band gap than core 11. Core 11 and the outermost shell film contribute to confinement of excited carriers generated in the shell film of the group 13 nitride mixed crystal semiconductor, so that the luminous efficiency can be improved.

Nanocrystalline phosphor 15 having shell layer 14 formed by first shell film 12 and second shell film 13 corresponding to the outermost shell film with first shell film 12 made of the group 13 nitride mixed crystal semiconductor is now described as the preferred embodiment. Nanocrystalline phosphor 15 has a three-layer structure carriers excited by excitation light are confined in first shell film 12, and the confined carriers efficiently emit light by recombination. First shell film 12 absorbs the excitation light and emits light. Core 11 and second shell film 13 contribute to confinement of the excited carriers generated in first shell film 12, for improving the luminous efficiency. First shell film 12 absorbs and excites the energy of the excitation light.

At this time, the band gap of first shell film 12 is preferably in the range of 1.8 to 2.8 eV. This band gap is particularly preferably in the range of 1.85 to 2.5 eV when nanocrystalline phosphor 15 emits red light, in the range of 2.3 to 2.5 eV when nanocrystalline phosphor 15 emits green light, and in the range of 2.65 to 2.8 eV when nanocrystalline phosphor 15 emits blue light. The color of the light emitted by nanocrystalline phosphor 15 is decided by adjusting the mixed crystal ratio in the group 13 nitride mixed crystal semiconductor.

When the thickness of first shell film 12 forming nanocrystalline phosphor 15 is not more than twice the Bohr radius, the luminous intensity is remarkably improved. The term "Bohr radius" denotes the spread of existence probability of excitons, which is expressed in the following formula (1). For example, the Bohr radii of gallium nitride and indium nitride are about 3 nm and about 7 nm respectively.

$$y = 4\pi \in h^2 \cdot me^2 \qquad \text{formula (1)}$$

where y represents Bohr radius, $\in$ represents dielectric constant, h represents Planck's constant, m represents effective mass and e represents elementary charge.

While the optical band gap further spreads due to the quantum size effect when the particle diameter of nanocrystalline phosphor 15 is not more than twice the Bohr radius, the band gap of first shell film 12 is preferably in the aforementioned range also in this case.

Nanocrystalline phosphor 15, not particularly restricted in shape but may be spherical, in the form of a rectangular parallelepiped, polygonal or provided with holes or protrusions, is preferably spherical due to spatial isotropy of electron confinement. The term "spherical" denotes such a state that the aspect ratio (ratio of maximum diameter to minimum diameter) of nanocrystalline phosphor 15 is 1 to 2.

As to the core/shell structure of nanocrystalline phosphor 15 according to the present invention, the particle diameter of core 11 and the thickness of shell layer 14 can be confirmed by confirming a lattice fringe image at a high magnification through TEM observation. The particle diameter of nanocrystalline phosphor 15 is preferably in the range of 5 to 100 nm, particularly preferably in the range of 6 to 50 nm, and further preferably in the range of 7 to 20 nm. The particle diameter is obtained on the assumption that nanocrystalline phosphor 15 is spherical for convenience.

[Core]

Core 11 according to the present invention is made of the group 13 nitride semiconductor, which is a compound having bonds of a group 13 element selected from B, Al, Ga, In and Ti and nitrogen atoms. Core 11 is preferably made of gallium nitride (GaN), aluminum nitride (AlN) or boron nitride (BN) in view of the band gap, and particularly preferably prepared from gallium nitride exhibiting relatively excellent lattice matching with first shell film 12 serving as an emission layer. The average particle diameter of core 11 according to the present invention is generally estimated as 5 to 6 nm from the spectral line half-width, as a result of X-ray diffraction measurement.

Core 11 may contain unintentional impurities. Either a group 2 element selected from Be, Mg, Ca, Sr and Ba or an element selected from Zn and Si may be intentionally added to core 11 as a dopant. When intentionally added to core 11, this dopant preferably has a low concentration. The concentration of the dopant is particularly preferably in the range of $1 \times 10^{16}$ cm$^{-3}$ to $1 \times 10^{21}$ cm$^{-3}$, and Mg, Zn or Si is preferably employed as the dopant.

[Shell Layer]

Shell layer 14 according to the present invention includes the shell film of the group 13 nitride mixed crystal semiconductor, which is a compound having bonds of atoms of at least two group 13 elements selected from B, Al, Ga, In and Tl and nitrogen atoms. The group 13 nitride mixed crystal semiconductor preferably contains indium in view of the band gap, and InGaN, InAlN or InAlGaN is employed. Mixed crystals of indium and gallium are easy to form, and indium and gallium are homogeneously bonded to nitrogen to form a nitride with less defects and excellent crystallinity. Thus, InGaN is particularly preferable.

When the group 13 nitride mixed crystal semiconductor contains indium, the ratio of indium atoms contained in the group 13 nitride mixed crystal semiconductor is preferably 5 to 60 mole %, particularly preferably 10 to 50 mole %. A group 13 nitride mixed crystal semiconductor containing indium atoms in the aforementioned ratio along with another group 13 element, particularly preferably gallium, absorbs excitation light of 400 to 410 nm with high efficiency and can emit red, green or blue light having high luminous efficiency.

Inconvenience results in ultraviolet emission if the ratio of indium atoms contained in the group 13 nitride mixed crystal semiconductor is less than 5 mole %, while inconvenience results in infrared emission if the ratio is greater than 60 mole %.

Shell layer 14 according to the present invention may have a single shell structure formed by a shell film of the group 13 nitride mixed crystal semiconductor, or a multilayer structure formed by a plurality of shell films. The term "shell film" denotes a film constituting shell layer 14 and covering core 11. The shell film may partially or entirely cover core 11 or an adjacent shell film, and the thickness of the shell film may be distributional. If shell layer 14 has a multilayer structure formed by at least two shell films, the shell films are referred to as a first shell 12 and a second shell 13 from the side closer to core 11, while the band gap of first shell 12 is preferably smaller than that of core 11, and the band gap of second shell 13 is preferably larger than that of core 11.

The thickness of shell layer 14 is preferably not more than twice the Bohr radius of the material therefor, in order to attain a high effect of quantum confinement. Further, the thickness of shell layer 14 is particularly preferably in the range of 1 to 10 nm. If the thickness of shell layer 14 is smaller than 1 nm, the surface of core 11 cannot be sufficiently coated and a homogeneous emission layer is hard to form. If the thickness of shell layer 14 is larger than 10 nm, on the other hand, the effect of quantum confinement is weakened, it is difficult to homogeneously form shell layer 14, the number of defects is increased, and the cost for the raw material leads to an unpreferable result.

Shell layer 14 may contain unintentional impurities. Either a group 2 element selected from Be, Mg, Ca, Sr and Ba or an element selected from Zn and Si may be intentionally added to shell layer 14 as a dopant. When intentionally added to shell layer 14, this dopant preferably has a low concentration. The concentration of the dopant is particularly preferably in the range of $1 \times 10^{16}$ cm$^{-3}$ to $1 \times 10^{21}$ cm$^{-3}$, and Mg, Zn or Si is preferably employed as the dopant.

[Modified Organic Molecule]

The material for modified organic molecules 16 according to the present invention is defined as a compound having hydrophilic groups and hydrophobic groups in molecules. A compound having groups selected from nitrogen-containing functional groups, sulfur-containing functional groups, acid groups, amide groups, phosphine groups, phosphine oxide groups and hydroxyl groups can be listed as the material for modified organic molecules 16.

Further, amine which is a compound having nonpolar hydrocarbon ends as hydrophobic groups and amino groups as hydrophilic groups can preferably be listed as the material for modified organic molecules 16. More specifically, tripentyl amine, trihexyl amine, triheptyl amine, trioctyl amine, trinonyl amine, tridecyl amine, triundecyl amine or the like can be listed.

When coated with modified organic molecules 16, nanocrystalline phosphor 15 having a wide gap is isolated from other nanocrystalline phosphors 15 by modified organic molecules 16. Modified organic molecules 16 can protect the surface of nanocrystalline phosphor 15, for reducing the number of defects on this surface. Therefore, coated nanocrystalline phosphor 10 has excellent dispersibility, and is easy to handle.

Modified organic molecules 16 conceivably cause electric polarity between heteroatoms and carbon atoms, to strongly adhere to the surface of nanocrystalline phosphor 15. The coating with modified organic molecules 16 is conceivably contributed by both of such chemical bonds that heteroatoms of modified organic molecules 16 are coordinate-bonded to nanocrystalline phosphor 15 and bonds resulting from physical adsorption. The thickness of modified organic molecules 16 covering nanocrystalline phosphor 15 can be confirmed by confirming a lattice fringe image at a high magnification through TEM observation.

[Method of Preparing Nanocrystalline Phosphor and Coated Nanocrystalline Phosphor]

Nanocrystalline phosphor 15 according to the present invention is prepared by heating a mixed solution containing core 11 of the group 13 nitride semiconductor, a nitrogen-containing compound and a group 13 element-containing compound and causing a chemical reaction. The heating temperature is preferably 180 to 500° C., more preferably 280 to 400° C., and the mixed solution can be heated to a temperature lower than that for a vapor phase reaction. The reaction temperature is too low and crystals are incomplete if the heating temperature is lower than 180° C., while organic molecules contained in the mixed solution are decomposed and incorporated into crystals as impurities if the heating temperature is higher than 500° C. The group 13 element-containing compound is a compound containing atoms of a group 13 element, and preferably a compound having bonds of atoms of the group 13 element and nitrogen atoms. When the group 13 element-containing compound is a compound having bonds of atoms of the group 13 element and nitrogen atoms, for example, nanocrystalline phosphor 15 can be prepared by heating a mixed solution containing core 11 and this group 13 element-containing compound and causing a chemical reaction.

Either the group 13 element-containing compound or the nitrogen-containing compound is preferably a compound having bonds of indium and/or gallium and nitrogen. Mixed crystals of indium and gallium are easy to form, and indium and gallium are easily homogeneously bonded to nitrogen. The thickness of shell layer 14 can be controlled by controlling the mixing ratios between core 11, the nitrogen-containing compound and the group 13 element-containing compound.

The modified organic molecules 16 is further mixed into the aforementioned mixed solution. The particle diameter of nanocrystalline phosphor 15 can be controlled by properly selecting modified organic molecules 16 mixed in the preparation step. The preparation method according to the present invention has a smaller number of steps than vapor phase synthesis, and can prepare nanocrystalline phosphor 15 and coated nano crystalline phosphor 10 in one stage by liquid phase synthesis, for allowing mass synthesis.

The size of nanocrystalline phosphor 15 can be reduced by increasing the molecular weight of modified organic molecules 16 in the mixed solution, while the size of nanocrystalline phosphor 15 can be increased by reducing the molecular weight of modified organic molecules 16 in the mixed solution. This is conceivably because modified organic molecules 16 also serve as a surface-active agent in the preparation step. In other words, it is conceivable that the length and stereoscopic bulkiness of hydrophobic groups bonded to heteroatoms are increased and modified organic molecules 16 are easily condensed as the molecular weight of modified organic molecules 16 is increased, to reduce the size of nanocrystalline phosphor 15 in the process of preparation.

In the preparation method according to the present invention, modified organic molecules 16 are preferably prepared from amine, which is a compound having nonpolar hydrocarbon ends as hydrophobic groups and amino groups as hydrophilic groups. In order to control the particle diameter of nanocrystalline phosphor 15, the material for modified organic molecules 16 is preferably tertiary amine. Tripentyl amine, trihexyl amine, triheptyl amine, trioctyl amine, trinonyl amine, tridecyl amine, triundecyl amine or the like can be listed as a specific example of the tertiary amine.

Core 11 is formed by heating the aforementioned mixed solution containing the nitrogen-containing compound, the group 13 element-containing compound and modified organic molecules 16.

A preferred embodiment of the preparation method according to the present invention is now described with reference to nanocrystalline phosphor 15 having shell layer 14 formed by first shell film 12 of the group 13 nitride mixed crystal semiconductor and second shell film 13. The preparation method is described with reference to the steps of "preparation of compound having bonds of atoms of group 13 element and nitrogen atoms", "formation of core", "formation of first shell film" and "formation of second shell film: completion of coated nanocrystalline phosphor".

[Preparation of Compound having Bonds of Atoms of Group 13 Element and Nitrogen Atoms Preparation of Material]

As exemplary methods of preparing a compound having bonds of atoms of a group 13 element and nitrogen atoms preferably employed as the aforementioned nitrogen-containing compound or group 13 element-containing compound, methods of preparing compounds having bonds of gallium atoms and nitrogen atoms, bonds of indium atoms and nitrogen atoms and bonds of aluminum atoms and nitrogen atoms in molecules respectively are now described. These compounds can be used as precursors for forming core 11 of the group 13 nitride semiconductor, and is also employable in the following preparation steps:

A tris(dimethylamino) aluminum dimer, a tris(dimethylamino) gallium dimer, a tris (dimethylamino) indium dimer and hexa(dimethylamino) indium-gallium can be synthesized by causing chemical reactions shown in chemical formulas (1) to (4) respectively.

First, lithium dimethylamide and aluminum trichloride are added to a solvent of n-hexane, and a chemical reaction is caused while stirring the mixture at 5 to 30° C., more preferably 10 to 25° C. for 24 to 120 hours, more preferably 48 to 72 hours. After this chemical reaction is completed, lithium chloride formed as a byproduct is removed, and a tris(dimethylamino) aluminum dimer is taken out. This chemical reaction is expressed in the following chemical formula (1):

$2AlCl_3 + 6LiN(CH_3)_2 \rightarrow [Al(N(CH_3)_2)_3]_2 + 6LiCl$ chemical formula (1)

The tris(dimethylamino) aluminum dimer is a dimer formed by tris(dimethylamino) aluminum molecules bonded to each other through aluminum atoms and dimethylamino groups.

A tris(dimethylamino) gallium dimer is synthesized by stirring lithium dimethylamide and gallium trichloride in an n-hexane solvent by a similar method. This chemical reaction is expressed in the following chemical formula (2):

$2GaCl_3 + 6LiN(CH_3)_2 \rightarrow [Ga(N(CH_3)_2)_3]_2 + 6LiCl$ chemical formula (2)

The tris(dimethylamino) gallium dimer is a dimer formed by tris(dimethylamino) gallium molecules bonded to each other through aluminum atoms and dimethylamino groups.

A tris(dimethylamino) indium dimer is synthesized by stirring lithium dimethylamide and indium trichloride in an n-hexane solvent by a similar method. This chemical reaction is expressed in the following chemical formula (3):

$2InCl_3 + 6LiN(CH_3)_2 \rightarrow [In(N(CH_3)_2)_3]_2 + 6LiCl$ chemical formula (3)

The tris(dimethylamino) indium dimer is a dimer formed by tris(dimethylamino) indium molecules bonded to each other through aluminum atoms and dimethylamino groups.

Then, the tris(dimethylamino) indium dimer and the tris (dimethylamino) gallium dimer synthesized by the aforementioned methods are added to an n-hexane solvent, and a chemical reaction is caused while stirring the mixture at 5 to 30° C., more preferably at 10 to 25° C. for 24 to 120 hours, more preferably for 48 to 72 hours. After this chemical reaction is completed, hexa(dimethylamino) indium-gallium is taken out. This chemical reaction is expressed in the following chemical formula (4):

½[In(N(CH$_3$)$_2$)$_3$]$_2$+½[Ga(N(CH$_3$)$_2$)$_3$]$_2$→[((CH$_3$)$_2$N)$_2$In-(μ-N(CH$_3$)$_2$)$_2$—Ga(N(CH$_3$)$_2$)$_2$]   chemical formula (4)

Since lithium dimethylamide and the produced tris(dimethylamino) aluminum dimer, tris(dimethylamino) gallium dimer, tris(dimethylamino) indium dimer and hexa(dimethylamino) indium-gallium have high reactivity, all of the aforementioned chemical reactions are preferably caused in an inert gas atmosphere.

The notation "μ-N(CH$_3$)$_2$" in the chemical formulas denotes that the dimethylamino groups are ligands linking In and Ga with each other in molecules. This also applies to the following description.

In the preparation method according to the present invention, a compound other than the aforementioned compound having the bonds of atoms of the group 13 element and nitrogen atoms is also employable.

[Formation of Core]

After a mixed solution prepared by dissolving 0.1 to 10 mass % of the group 13 element-containing compound and the nitrogen-containing compound for forming core 11 in total at an arbitrary ratio and 1 to 50 mass % of modified organic molecules 16 in a hydrocarbon-based solvent is sufficiently stirred, a chemical reaction is caused. At this time, the particle diameter of core 11 can be controlled by adjusting the molecular weight of modified organic molecules 16.

This chemical reaction is caused in an inert gas atmosphere, and completed by heating the mixed solution while stirring the same at 180 to 500° C., more preferably at 280 to 400° C. for 6 to 72 hours, more preferably for 12 to 48 hours. Core 11 is formed by this chemical reaction.

Formed core 11 is coated with modified organic molecules 16.

[Formation of First Shell Film]

Then, first shell film 12 is formed. With respect to the mixed solution containing core 11 formed by the aforementioned chemical reaction, a new mixed solution is prepared by dissolving 0.1 to 10 mass % of the group 13 element-containing compound and the nitrogen-containing compound in total at an arbitrary ratio and 1 to 50 mass % of modified organic molecules 16 in a hydrocarbon-based solvent. The thickness of first shell film 12 can be controlled by adjusting the arbitrary ratio, and can also be controlled by adjusting the molecular weight of modified organic molecules 16. At this time, first shell film 12 is made of the group 13 nitride mixed crystal semiconductor, whereby the group 13 element-containing compound and/or the nitrogen-containing compound preferably contains atoms of at least two types of group 13 elements. When the group 13 element-containing compound contains only atoms of a single group 13 element, for example, the nitrogen-containing compound must contain atoms of at least one group 13 element other than this group 13 element. The thickness of first shell film 12 can be controlled by adjusting the arbitrary ratio. Then, 1 to 50 mass % of modified organic molecules 16 are further mixed into the mixed solution. After this mixed solution is sufficiently stirred, a chemical reaction is caused.

This chemical reaction is caused in an inert gas atmosphere, and completed by heating the mixed solution while stirring the same at 180 to 500° C., more preferably at 280 to 400° C. for 6 to 72 hours, more preferably for 12 to 48 hours. First shell film 12 is formed by this chemical reaction.

The surface of first shell film 12 is coated with modified organic molecules 16.

[Formation of Second Shell Film: Completion of Coated Nanocrystalline Phosphor]

Then, second shell film 13 is formed. With respect to the mixed solution after formation of first shell film 12 by the aforementioned chemical reaction, a new mixed solution is prepared by dissolving 0.1 to 10 mass % of the group 13 element-containing compound and the nitrogen-containing compound in total at an arbitrary ratio and 1 to 50 mass % of modified organic molecules 16 in a hydrocarbon-based solvent. The thickness of second shell film 13 can be controlled by adjusting the arbitrary ratio, and can also be controlled by adjusting the molecular weight of modified organic molecules 16. After this mixed solution is sufficiently stirred, a chemical reaction is caused.

This chemical reaction is caused in an inert gas atmosphere, and completed by heating the mixed solution while stirring the same at 180 to 500° C., more preferably at 280 to 400° C. for 6 to 72 hours, more preferably for 12 to 48 hours. After this chemical reaction, the mixed solution is washed with n-hexane and anhydrous methanol several times, in order to remove organic impurities.

As hereinabove described, the mixed solution containing core 11 of the group 13 nitride semiconductor, the nitrogen-containing compound and the group 13 element-containing compound is so heated that first shell film 12 grows, and second shell film 13 is prepared from the group 13 element-containing compound and the nitrogen-containing compound as added.

According to the aforementioned preparation method, formation of nanocrystalline phosphor 15 and formation of coated nanocrystalline phosphor 10 prepared by coating the same with modified organic molecules 16 simultaneously progress. Thus, coated nanocrystalline phosphor 15 coated with modified organic molecules 16 can be obtained.

In the present invention, a compound solution consisting of only carbon atoms and hydrogen atoms is referred to as a hydrocarbon-based solvent. The hydrocarbon-based solvent is so employed that moisture and oxygen can be inhibited from being mixed into the synthetic solution. Examples of the hydrocarbon-based solvent are n-pentane, n-hexane, n-heptane, n-octane, cyclopentane, cyclohexane, cycloheptane, benzene, toluene, o-xylene, m-xylene and p-xylene.

In the present invention, at least two types of modified organic molecules 16 are preferably contained. The particle diameter of nanocrystalline phosphor 15 can be controlled by containing at least two types of modified organic molecules 16.

EXAMPLES

Example 1

A coated nanocrystalline phosphor having a core of gallium nitride was synthesized by the following method:

(Preparation of Material)

First, a tris(dimethylamino) gallium dimer, a tris(dimethylamino) indium dimer and hexa(dimethylamino) indium-gallium necessary for forming the core, a first shell film and a second shell film were prepared. These compounds were synthesized and prepared by the chemical reactions expressed in the above chemical formulas (2), (3) and (4) respectively. All of these chemical reactions were performed in a nitrogen gas atmosphere, due to the high reactivity of lithium dimethylamide employed in the chemical reactions and produced tris(dimethylamino) gallium dimer, tris(dimethylamino) indium dimer and hexa(dimethylamino) indium-gallium.

First, 0.03 moles of lithium dimethylamide and 0.01 moles of gallium trichloride were weighed in a glove box, and a chemical reaction was caused at a heating temperature of 20° C. for 50 hours while stirring the materials in n-hexane. After completion of this chemical reaction, lithium chloride formed as a byproduct was removed, and a tris(dimethylamino) gallium dimer was taken out (chemical formula (2)). A tris(dimethylamino) indium dimer was synthesized by a similar method (chemical formula (3)). Further, 0.005 moles of the tris(dimethylamino) indium dimer and 0.05 moles of the tris (dimethylamino) gallium dimer synthesized by the aforementioned methods respectively were weighed, and a chemical reaction was caused at a heating temperature of 20° C. for 50 hours while stirring the materials in n-hexane. After completion of the chemical reaction, hexa(dimethylamino) indium-gallium was taken out (chemical formula (4)).

(Formation of Core)

In order to form the core, a mixed solution was prepared by mixing 0.02 moles of the tris(dimethylamino) gallium dimer, 30 g of trioctylamine (molecular weight: 353.67) and 200 ml of benzene serving as a solvent with each other. After the mixed solution was sufficiently stirred, a chemical reaction expressed in the following chemical formula (5) was caused:

$[Ga(N(CH_3)_2)_3]_2 \rightarrow GaN$   chemical formula (5)

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The core of gallium nitride was formed by this chemical reaction. Since the surface of the core was coated with trioctyl amine, this state is hereinafter referred to also as GaN/nN $(C_8H_{17})_3$. In relation to this Example, it is assumed that provisional notation "A/B" denotes that A is coated with B.

(Formation of First Shell Film)

Then, a new mixed solution was prepared by mixing 100 ml of the mixed solution containing $GaN/nN(C_8H_{17})_3$ obtained by causing the chemical reaction in the aforementioned method and the following four types of materials with each other, in order to coat the core of gallium nitride with the first shell film of indium nitride-gallium mixed crystals (InGaN):

0.04 moles of hexa(dimethylamino) indium-gallium
  0.06 moles of tris(dimethylamino) gallium dimer
  30 g of trioctyl amine as modified organic molecules
  100 ml of benzene as solvent After the newly prepared mixed solution was sufficiently stirred, a chemical reaction expressed in the following chemical formula (6) was caused:

$GaN+0.2[((CH_3)_2N)_2In-(\mu-N(CH_3)_2)_2-Ga(N(CH_3)_2)_2]+0.3[Ga(N(CH_3)_2)_3]_2 \rightarrow GaN/In_{0.2}Ga_{0.8}N$   chemical formula (6)

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The first shell film of indium nitride-gallium mixed crystals was formed on the surface of the core by this chemical reaction. Since the outer surface of the first shell film was coated with trioctyl amine, this state is hereinafter referred to also as $GaN/In_{0.2}Ga_{0.8}N/nN(C_8H_{17})_3$.

(Formation of Second Shell Film: Completion of Coated Nanocrystalline Phosphor)

Then, a new mixed solution was prepared by mixing 100 ml of the mixed solution containing $GaN/In_{0.2}Ga_{0.8}N/nN(C_8H_{17})_3$ obtained by causing the chemical reaction in the aforementioned method and the following three types of materials with each other, in order to coat the outer surface of the first shell film with the second shell film:

0.1 moles of tris(dimethylamino) gallium dimer
30 g of trioctyl amine as modified organic molecules
100 ml of benzene as solvent After the newly prepared mixed solution was sufficiently stirred, a chemical reaction expressed in the following chemical formula (7) was caused:

$GaN/In_{0.2}Ga_{0.8}N+[Ga(N(CH_3)_2)_3]_2 \rightarrow GaN/In_{0.2}Ga_{0.8}N/GaN$  chemical formula (7)

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The second shell film of gallium nitride was formed on the outer surface of the first shell film by this chemical reaction, and the nanocrystalline phosphor was completed. Formation of a coated nanocrystalline phosphor obtained by coating the outer surface of the nanocrystalline phosphor with the modified organic molecules of trioctylamine simultaneously progressed along with this formation of the second shell film. The coated nanocrystalline phosphor formed in this Example is hereinafter referred to also as $GaN/In_{0.2}Ga_{0.8}N/GaN/nN(C_8H_{17})_3$.

(Character of Coated Nanocrystalline Phosphor)

In $GaN/In_{0.2}Ga_{0.8}N/GaN/nN(C_8H_{17})_3$ obtained in this Example, the outer surface of the nanocrystalline phosphor was homogeneously coated with the modified organic molecules. This nanocrystalline phosphor did not flocculate, had a uniform size, and exhibited high dispersibility.

Further, a blue light-emitting device of a group 13 nitride was employable as the excitation source for this coated nanocrystalline phosphor, which was capable of efficiently absorbing light of 405 nm having particularly high external quantum efficiency. The first shell film of $In_{0.2}Ga_{0.8}N$ was capable of exhibiting blue emission due to the In composition ratio so adjusted that the emission wavelength was 460 nm. Further, it was possible to control the particle diameter of the nanocrystalline phosphor with the modified organic molecules. As a result of X-ray diffraction measurement of the obtained coated nanocrystalline phosphor, the thickness of the first shell film estimated from the spectral line half-width was calculated as 5 nm according to Scherrer's equation expressed in the following formula (2), to exhibit a quantum size effect and improve luminous efficiency. The yield of the phosphor obtained in this Example was 95%.

$B = \lambda / \cos \Theta \cdot R$  formula (2)

where B represents the X-ray half-width [deg], λ represents the wavelength [nm] of X-rays, Θ represents Bragg angle [deg], and R represents the particle diameter [nm].

Example 2

A coated nanocrystalline phosphor having a core of aluminum nitride was synthesized by the following method:

(Pretreatment)

First, a tris(dimethylamino) aluminum dimer, a tris(dimethylamino) gallium dimer and hexa(dimethylamino) indium-gallium necessary for forming the core, a first shell film and a second shell film were synthesized similarly to Example 1.

(Formation of Core)

In order to form the core, a mixed solution was prepared by mixing 0.02 moles of the tris(dimethylamino) aluminum dimer, 30 g of trioctyl amine (molecular weight: 353.67) and 200 ml of benzene serving as a solvent with each other. After the mixed solution was sufficiently stirred, a chemical reaction expressed in the following chemical formula (8) was caused:

$[Al(N(CH_3)_2)_3]_2 \rightarrow AlN$  chemical formula (8)

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The core of aluminum nitride was formed by this chemical reaction. Since the surface of the core was coated with trioctyl amine, this state is hereinafter referred to also as $AlN/nN(C_8H_{17})_3$.

(Formation of First Shell Film)

Then, a new mixed solution was prepared by mixing 100 ml of the mixed solution containing $AlN/nN(C_8H_{17})_3$ obtained by causing the chemical reaction in the aforementioned method and the following four types of materials with each other, in order to coat the core of aluminum nitride with the first shell film of indium nitride-gallium mixed crystals (InGaN):

0.04 moles of hexa(dimethylamino) indium-gallium
0.06 moles of tris(dimethylamino) gallium dimer
30 g of trioctyl amine as modified organic molecules
100 ml of benzene as solvent After the newly prepared mixed solution was sufficiently stirred, a chemical reaction expressed in the following chemical formula (9) was caused:

$AlN+0.2[((CH_3)_2N)_2In-(\mu-N(CH_3)_2)_2-Ga(N(CH_3)_2)_2]+0.3[Ga(N(CH_3)_2)_3]_2 \rightarrow AlN/In_{0.2}Ga_{0.8}N$  chemical formula (9)

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The first shell film of indium nitride-gallium mixed crystals was formed on the surface of the core by this chemical reaction. Since the outer surface of the first shell film was coated with trioctyl amine, this state is hereinafter referred to also as $AlN/In_{0.2}Ga_{0.8}N/nN(C_8H_{17})_3$.

(Formation of Second Shell Film: Completion of Coated Nanocrystalline Phosphor)

Then, a new mixed solution was prepared by mixing 100 ml of the mixed solution containing $AlN/In_{0.2}Ga_{0.8}N/nN(C_8H_{17})_3$ obtained by causing the chemical reaction in the aforementioned method and the following three types of materials with each other, in order to coat the surface of the first shell film with the second shell film:

0.1 moles of tris(dimethylamino) aluminum dimer 30 g of trioctyl amine as modified organic molecules 100 ml of benzene as solvent After the newly prepared mixed solution was sufficiently stirred, a chemical reaction expressed in the following chemical formula (10) was caused:

$$AlN/In_{0.2}Ga_{0.8}N + [Al(N(CH_3)_2)_3]_2 \rightarrow AlN/In_{0.2}Ga_{0.8}N/AlN \quad \text{chemical formula (10)}$$

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The second shell film of aluminum nitride was formed on the outer surface of the first shell film by this chemical reaction) and the nanocrystalline phosphor was completed. Formation of a coated nanocrystalline phosphor obtained by coating the outer surface of the nanocrystalline phosphor with the modified organic molecules of trioctylamine simultaneously progressed along with this formation of the second shell film. The coated nanocrystalline phosphor formed in this Example is hereinafter referred to also as AlN/In$_{0.2}$Ga$_{0.8}$N/AlN/nN(C$_8$H$_{17}$)$_3$.

(Character of Coated Nanocrystalline Phosphor)

In AlN/In$_{0.2}$Ga$_{0.8}$N/AlN/nN(C$_8$H$_{17}$)$_3$ obtained in this Example, the outer surface of the nanocrystalline phosphor was homogeneously coated with the modified organic molecules. This nanocrystalline phosphor did not flocculate, had a uniform size, and exhibited high dispersibility.

Further, a blue light-emitting device of a group 13 nitride was employable as the excitation source for the coated nanocrystalline phosphor, which was capable of efficiently absorbing light of 405 nm having particularly high external quantum efficiency. The first shell film of In$_{0.2}$Ga$_{0.8}$N was capable of exhibiting blue emission due to the In composition ratio so adjusted that the emission wavelength was 460 nm. Further, it was possible to control the particle diameter of the nanocrystalline phosphor with the modified organic molecules. As a result of X-ray diffraction measurement of the obtained coated nanocrystalline phosphor, the thickness of the first shell film estimated from the spectral line half-width was calculated as 5 nm according to Scherrer's equation expressed in the formula (2), to exhibit a quantum size effect and improve luminous efficiency. The yield of the phosphor obtained in this Example was 95%.

Example 3

A coated nanocrystalline phosphor having a core of gallium nitride, a first shell film of In$_{0.3}$Ga$_{0.7}$N and a second shell film of gallium nitride was synthesized by the following method:

It was possible to obtain a coated nanocrystalline phosphor emitting green light when absorbing light emitted from a blue light-emitting device of a group 13 nitride by a preparation method similar to that of Example 1, except that a mixed solution of 0.06 moles of hexa(dimethylamino) indium-gallium, 0.04 moles of a tris(dimethylamino) gallium dimer, 30 g of trioctyl amine and 100 ml of benzene serving as a solvent was employed for forming the first shell film. The obtained coated nanocrystalline phosphor was capable of efficiently absorbing light of 405 nm having particularly high external quantum efficiency. At this time, the emission wavelength was 520 nm.

As a result of X-ray diffraction measurement, the thickness of the first shell film estimated from the spectral line half-width was calculated as 5 nm according to Scherrer's equation to exhibit a quantum size effect, and peak luminous intensity was improved by about 20 times as compared with a conventional indium nitride-gallium mixed crystal semiconductor particle phosphor.

Example 4

A coated nanocrystalline phosphor having a core of gallium nitride, a first shell film of In$_{0.5}$Ga$_{0.5}$N and a second shell film of gallium nitride was synthesized by the following method:

It was possible to obtain a coated nanocrystalline phosphor emitting red light when absorbing light emitted from a blue light-emitting device of a group 13 nitride by a preparation method similar to that of Example 1, except that a mixed solution of 0.1 moles of hexa(dimethylamino) indium-gallium, 30 g of trioctyl amine and 100 ml of benzene serving as a solvent was employed for forming the first shell film. The obtained coated nanocrystalline phosphor was capable of efficiently absorbing light of 405 nm having particularly high external quantum efficiency. At this time, the emission wavelength was 600 nm.

As a result of X-ray diffraction measurement, the thickness of the first shell film estimated from the spectral line half-width was calculated as 5 nm according to Scherrer's equation to exhibit a quantum size effect, and peak luminous intensity was improved by about 20 times as compared with a conventional indium nitride-gallium mixed crystal semiconductor particle phosphor.

Example 5

A coated nanocrystalline phosphor having a core of aluminum nitride, a first shell film of In$_{0.3}$Ga$_{0.7}$N and a second shell film of aluminum nitride was synthesized by the following method:

It was possible to obtain a coated nanocrystalline phosphor emitting green light when absorbing light emitted from a blue light-emitting device of a group 13 nitride by a preparation method similar to that of Example 2, except that a mixed solution of 0.06 moles of hexa(dimethylamino) indium-gallium, 0.04 moles of a tris(dimethylamino) gallium dimer, 30 g of trioctyl amine and 100 ml of benzene serving as a solvent was employed for forming the first shell film. The obtained coated nanocrystalline phosphor was capable of efficiently absorbing light of 405 nm having particularly high external quantum efficiency. At this time, the emission wavelength was 520 nm.

As a result of X-ray diffraction measurement, the thickness of the first shell film estimated from the spectral line half-width was calculated as 5 nm according to Scherrer's equation to exhibit a quantum size effect, and peak luminous intensity was improved by about 20 times as compared with a conventional indium nitride-gallium mixed crystal semiconductor particle phosphor.

Example 6

A coated nanocrystalline phosphor having a core of aluminum nitride, a first shell film of In$_{0.5}$Ga$_{0.5}$N and a second shell film of aluminum nitride was synthesized by the following method:

It was possible to obtain a coated nanocrystalline phosphor emitting red light when absorbing light emitted from a blue light-emitting device of a group 13 nitride by a preparation method similar to that of Example 2, except that a mixed solution of 0.1 moles of hexa(dimethylamino) indium-gallium, 30 g of trioctyl amine and 100 ml of benzene serving as a solvent was employed for forming the first shell film. The obtained coated nanocrystalline phosphor was capable of efficiently absorbing light of 405 nm having particularly high external quantum efficiency. At this time, the emission wavelength was 600 nm.

As a result of X-ray diffraction measurement, the thickness of the first shell film estimated from the spectral line half-width was calculated as 5 nm according to Scherrer's equation to exhibit a quantum size effect, and peak luminous intensity was improved by about 20 times as compared with a conventional indium nitride-gallium mixed crystal semiconductor particle phosphor.

Example 7

A coated nanocrystalline phosphor having a core of gallium nitride was synthesized by the following method:
(Formation of Core)
In order to form the core, a mixed solution was prepared by mixing 0.02 moles of gallium trichloride, 0.02 moles of lithium nitride ($Li_3N$), 30 g of trioctylamine (molecular weight: 353.67) and 200 ml of benzene serving as a solvent with each other. After the mixed solution was sufficiently stirred, a chemical reaction expressed in the following chemical formula (11) was caused:

$$GaCl_3 + Li_3N \rightarrow GaN + 3LiCl \quad \text{chemical formula (11)}$$

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The core of gallium nitride was formed by this chemical reaction. Since the surface of the core was coated with trioctyl amine, this state is hereinafter referred to also as GaN/nN$(C_8H_{17})_3$.

(Formation of First Shell Film)
Then, a new mixed solution was prepared by mixing 100 ml of the mixed solution containing GaN/nN$(C_8H_{17})_3$ obtained by causing the chemical reaction in the aforementioned method and the following five types of materials with each other, in order to coat the core of gallium nitride with a first shell film of indium nitride-gallium mixed crystals (InGaN):
0.08 moles of gallium trichloride
0.02 moles of indium trichloride
0.1 moles of lithium nitride
30 g of trioctyl amine as modified organic molecules
100 ml of benzene as solvent
After the newly prepared mixed solution was sufficiently stirred, a chemical reaction expressed in the following chemical formula (12) was caused:

$$GaN + 0.08GaCl_3 + 0.02InCl_3 + 0.1Li_3N \rightarrow GaN/In_{0.2}Ga_{0.8}N + 0.3LiCl \quad \text{chemical formula (12)}$$

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The first shell film of indium nitride-gallium mixed crystals was formed on the surface of the core by this chemical reaction. Since the outer surface of the first shell film was coated with trioctyl amine, this state is hereinafter referred to also as GaN/In$_{0.2}$Ga$_{0.8}$N/nN$(C_8H_{17})_3$.

(Formation of Second Shell Film: Completion of Coated Nanocrystalline Phosphor)
Then, a new mixed solution was prepared by mixing 100 ml of the mixed solution containing GaN/In$_{0.2}$Ga$_{0.8}$N/nN $(C_8H_{17})_3$ obtained by causing the chemical reaction in the aforementioned method and the following four types of materials with each other, in order to coat the outer surface of the first shell film with a second shell film:
0.1 moles of gallium trichloride
0.1 moles of lithium nitride ($Li_3N$)
30 g of trioctyl amine (molecular weight: 353.67) as modified organic molecules
100 ml of benzene as solvent
After the newly prepared mixed solution was sufficiently stirred, a chemical reaction expressed in the following chemical formula (13) was caused:

$$GaN/In_{0.2}Ga_{0.8}N + GaCl_3 + Li_3N \rightarrow GaN/In_{0.2}Ga_{0.8}N/GaN + 3LiCl \quad \text{chemical formula (13)}$$

This chemical reaction was completed by heating the mixed solution in a nitrogen gas atmosphere at 320° C. for 12 hours. The mixed solution was continuously stirred with a stirrer during this heating. Then, the mixed solution was washed with n-hexane and anhydrous methanol three times, in order to remove organic impurities from the mixed solution. The second shell film of aluminum nitride was formed on the outer surface of the first shell film by this chemical reaction, and the nanocrystalline phosphor was completed. Formation of a coated nanocrystalline phosphor obtained by coating the outer surface of the nanocrystalline phosphor with the modified organic molecules of trioctylamine simultaneously progressed along with this formation of the second shell film. The coated nanocrystalline phosphor formed in this Example is hereinafter referred to also as GaN/In$_{0.2}$Ga$_{0.8}$N/GaN/nN$(C_8H_{17})_3$.

(Character of Coated Nanocrystalline Phosphor)
The coated nanocrystalline phosphor obtained in this Example was capable of efficiently absorbing light of 405 nm having particularly high external quantum efficiency. At this time, the emission wavelength was 460 nm. As a result of X-ray diffraction measurement of the obtained coated nanocrystalline phosphor, the thickness of the first shell film estimated from the spectral line half-width was calculated as 5 nm according to Scherrer's equation to exhibit a quantum size effect, and peak luminous intensity was improved by about 10 times as compared with a conventional indium nitride-gallium mixed crystal semiconductor particle phosphor.

Comparative Example 1

A mixed solution was prepared by mixing 0.016 moles of gallium trichloride ($GaCl_3$), 0.004 moles of indium trichloride ($InCl_3$), 0.02 moles of lithium nitride ($Li_3N$) and 200 ml of benzene ($C_6H_{12}$) with each other. An indium nitride-gallium mixed crystal semiconductor particle phosphor was synthesized by heating the mixed solution at 320° C. for 3 hours. The heated mixed solution was cooled to the room temperature, thereby preparing a benzene solution of the indium nitride-gallium mixed semiconductor particle phosphor.

Figure 2:
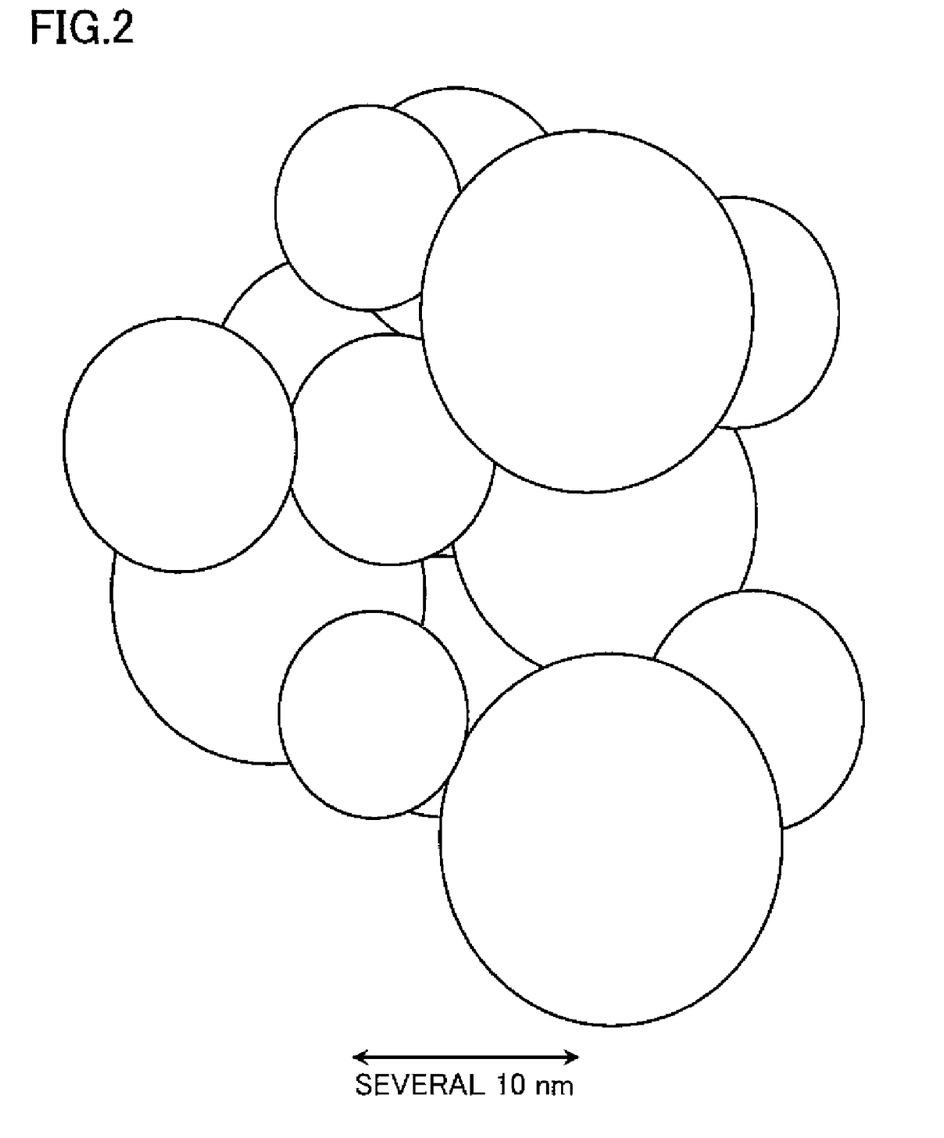
FIG. 2 is a model diagram of an indium nitride-gallium mixed crystal semiconductor particle phosphor synthesized according to comparative example 1.

FIG. 2 is a model diagram of the indium nitride-gallium mixed crystal semiconductor particle phosphor synthesized according to comparative example 1. The indium nitride-gallium mixed crystal semiconductor particle phosphor obtained in comparative example 1 had a large number of crystal defects since indium nitride-gallium mixed crystals forming an emission layer themselves were grown with no core serving as the nucleus, it was difficult to precisely control the mixed crystal ratio in the group 13 element, and regions where layers of indium nitride and gallium nitride segregated were observed in the indium nitride-gallium mixed crystals. Nonexistence of a layer for capping defects resulting from dangling bonds of the indium nitride-gallium mixed crystals led to a large number of surface defects, and the formed indium nitride-gallium mixed crystal semiconductor particle phosphor flocculated and exhibited inferior dispersibility due to nonexistence of modified organic molecules on the surface. Control of the particle diameter of the indium nitride-gallium mixed crystal semiconductor particle phosphor depended only on the reaction temperature and the reaction time in synthesis, whereby it was difficult to control the particle diameter.

As a result of X-ray diffraction measurement of the obtained indium nitride-gallium mixed crystal semiconductor particle phosphor, the average particle diameter estimated from the spectral line half-width was calculated as 50 nm according to Scherrer's equation, to exhibit no quantum size effect. The yield of the indium nitride-gallium mixed crystal semiconductor particle phosphor obtained according to comparative example 1 was 5%.

Figure 3:
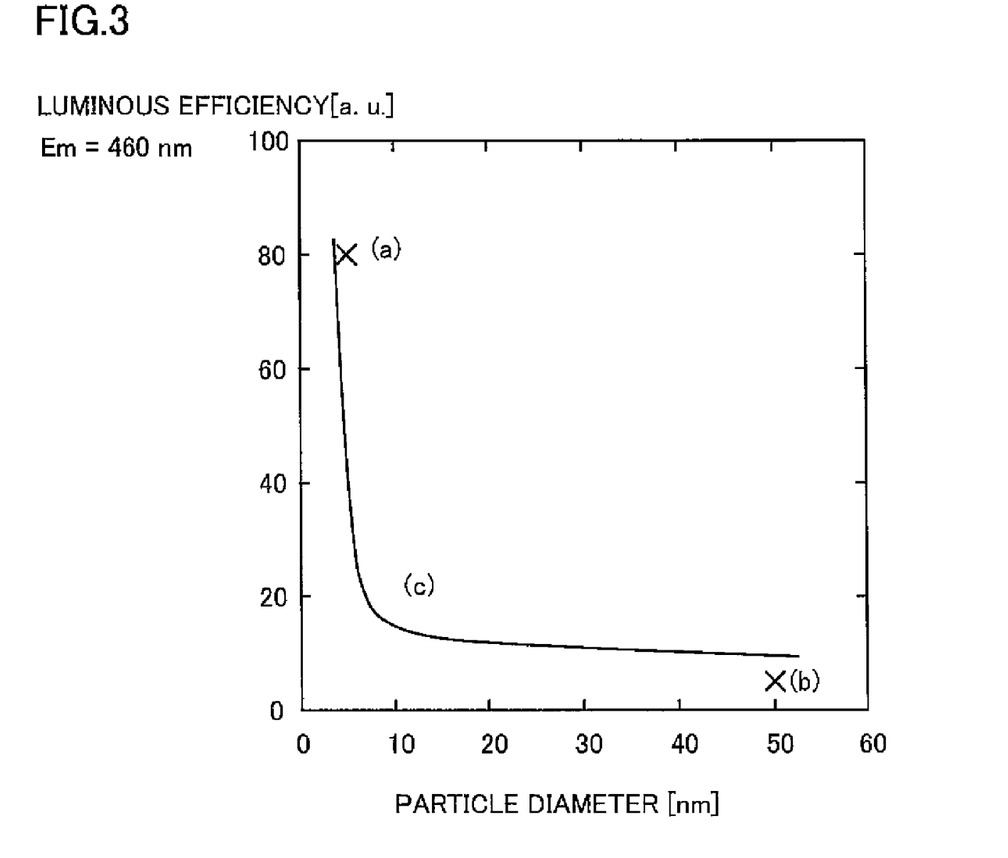
FIG. 3 illustrates the relation between luminous intensity and the sizes of emission layers for studying luminous characteristics of phosphors consisting of crystallites.

FIG. 3 illustrates the relation between luminous intensity and the sizes of emission layers for studying luminous characteristics of phosphors consisting of crystallites. The axis of abscissas shows the sizes of the emission layers of the phosphors consisting of crystallites, and the axis of ordinates shows arbitrary luminous intensity "a.u. (arbitrary units)" of the phosphors excited with light of 405 nm and emitting light at 460 nm. Referring to FIG. 3, (a) plots the relation between the thickness of the emission layer of the coated nanocrystalline phosphor according to Example 1 and the luminous intensity, and (b) plots the relation between the particle diameter of the indium nitride-gallium mixed crystal semiconductor particle phosphor according to comparative example 1 and the luminous intensity.

Referring to FIG. 3, (c) is a curve showing the relation between the luminous intensity and the particle diameters for studying luminous characteristics of the phosphors consisting of crystallites, and it is understood that the luminous intensity is remarkably improved when the particle diameter of the phosphor is not more than twice the Bohr radius.

As understood from FIG. 3, it has been recognized that the nanocrystalline phosphor included in the coated nanocrystalline phosphor according to Example 1 had a smaller Bohr radius and higher luminous efficiency than the indium nitride-gallium mixed crystal semiconductor particle phosphor according to comparative example 1.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A coated nanocrystalline phosphor, comprising:
    a nanocrystalline phosphor having a core/shell structure, said nanocrystalline phosphor including
        a core of a group 13 nitride semiconductor; and
        a shell layer, covering said core, including a shell film of a group 13 nitride mixed crystal semiconductor; and
    modified organic molecules bonded to and/or coating an outer surface of the nanocrystalline phosphor, wherein said shell layer is formed by:
        a first shell film of a group 13 nitride mixed crystal semiconductor having a smaller band gap than said core and covering said core; and
        a second shell film having a larger band gap than said core and coating said first shell film.

2. The coated nanocrystalline phosphor according to claim 1, wherein
    nitrogen atoms of said core and group 13 atoms of said shell layer are chemically bonded to each other, and
    nitrogen atoms of said shell layer and group 13 atoms of said core are chemically bonded to each other.

3. The coated nanocrystalline phosphor according to claim 1, wherein
    said core is made of gallium nitride.

4. The coated nanocrystalline phosphor according to claim 1, wherein
    said group 13 nitride mixed crystal semiconductor contains 5 to 60 mole % of indium atoms.

5. The coated nanocrystalline phosphor according to claim 1, wherein the thickness of said shell layer is not more than twice the Bohr radius.

6. The coated nanocrystalline phosphor according to claim 1, wherein said shell layer has a multilayer structure formed by a plurality of shell films.

7. A method of preparing a coated nanocrystalline phosphor according to claim 1 by mixing modified organic molecules into a mixed solution containing a core of a group 13 nitride semiconductor, a nitrogen-containing compound and a group 13 element-containing compound.

8. The method of preparing a coated nanocrystalline phosphor according to claim 7, wherein
    at least either said group 13 element-containing compound or said nitrogen-containing compound is a compound having bonds of indium and/or gallium and nitrogen.

9. The method of preparing a coated nanocrystalline phosphor according to claim 7, wherein
    a solvent for said mixed solution is a hydrocarbon-based solvent.

10. The method of preparing a coated nanocrystalline phosphor according to claim 7, wherein
    the temperature for heating said mixed solution is 180 to 500° C.

11. The method of preparing a coated nanocrystalline phosphor according to claim 7, wherein
    at least two types of said modified organic molecules are employed.

* * * * *